US012699454B2

(12) United States Patent
Komazaki et al.

(10) Patent No.: US 12,699,454 B2
(45) Date of Patent: Aug. 4, 2026

(54) TERMINAL APPARATUS, COMMUNICATION SYSTEM

(71) Applicant: NTT, Inc., Tokyo (JP)

(72) Inventors: Kakagu Komazaki, Tokyo (JP); Junji Watanabe, Tokyo (JP)

(73) Assignee: NTT, Inc., Tokyo (JP)

( * ) Notice: Subject to any disclaimer, the term of this patent is extended or adjusted under 35 U.S.C. 154(b) by 349 days.

(21) Appl. No.: 18/278,809

(22) PCT Filed: Mar. 3, 2021

(86) PCT No.: PCT/JP2021/008097
§ 371 (c)(1),
(2) Date: Aug. 24, 2023

(87) PCT Pub. No.: WO2022/185433
PCT Pub. Date: Sep. 9, 2022

(65) Prior Publication Data
US 2024/0134457 A1     Apr. 25, 2024
US 2024/0231495 A9     Jul. 11, 2024

(51) Int. Cl.
*G06F 3/01*     (2006.01)
*H04N 23/53*     (2023.01)

(52) U.S. Cl.
CPC ............. *G06F 3/016* (2013.01); *H04N 23/53* (2023.01)

(58) Field of Classification Search
CPC ........... G06F 3/016; G06F 3/01; H04N 23/53; H04N 7/14
USPC ......... 348/14.12, 14.03, 14.02, 14.08, 14.09, 348/14.1, 14.77, 14.78
See application file for complete search history.

(56) References Cited

U.S. PATENT DOCUMENTS

2015/0362993 A1* 12/2015 Billington ............ H04N 7/0255
                                                                   345/156
2020/0314554 A1* 10/2020 Xiao .................... H04R 1/2803

FOREIGN PATENT DOCUMENTS

JP          2009194779 A   *  8/2009

OTHER PUBLICATIONS

Online streaming (2020) "The 73 All Japan Fencing Championship" Live on Sep. 26, 2020 by Abema TV, Internet <URL: https://abema. tv/video/title/38-305> with its English translation generated by computer.

(Continued)

*Primary Examiner* — Duc Nguyen
*Assistant Examiner* — Carissa A Jones

(57) ABSTRACT

A vibration measurement presentation plate (160) is a substantially transparent plate and is disposed on a use position side of a user. A display (130) is disposed outside of an imaging range of the camera on a side opposite to the use position side with respect to the plate such that the plate side serves as a display surface. A camera (120) is disposed on the opposite side with respect to the plate and is outside of the viewing range of the display surface of the display via the plate from the use position side so that the plate side is in the imaging range. A vibration measurement sensor (140) and a vibrator (150) are attached to the plate to be out of the imaging range of the camera and out of the viewing range of the display surface of the display via the plate from the use position side.

5 Claims, 5 Drawing Sheets

(56) References Cited

OTHER PUBLICATIONS

Articles posted on the website of Nippon Telegraph and Telephone West Corporation (2020) "Sports×ITC a new way of sports in the new normal era Now is the time to bring ICT to sports." [Oct. 29, 2020] <URL: https://www.ntt-west.co.jp/brand/newnormal/fnec/> English translation only, generated by computer.

Twitter Posts [Oct. 29, 2020] <URL: https://twitter.com/NTTWestOfficial/status/1321647947025575937?cxt= HHwWgsCricbzt9ckAAAA> with its English translation generated by computer.

Furue vol. 32 published on the website Articles (2021) "Sports and Well-Being" [Jan. 1, 2021] <URL:http://furue.ilab.ntt.co.jp/book/202101/index.html> with its English translation generated by computer.

The Institute of Electrical Engineers of Japan (2021) "Touched and Connected Mind and Society" IEEJ Journal, vol. 141, No. 2 [Feb. 1, 2021] pp. 86-88, with its translation generated by computer.

An article in Nikkei Business No. 2067 (2020) "What is the new standard from the perspective of sports x ITC?" [Nov. 23, 2020] with its translation generated by computer.

Japan soccer Association, "Remote High Five With Samurai Blue!" International Goodwill Game@Utrecht, The Netherlands, [online] [Retrieved on Dec. 5, 2020], Internet <URL: https://www.jfa.jp/samuraiblue/news/00025513/> with its English translation generated by computer.

"Experience social haptics 'Public Tactile Communication'", magazine Future produced by NTT Laboratories specializing in tactile content, [online] [Retrieved on Dec. 5, 2020], Internet <URL: http://furue.ilab.ntt.co.jp/book/201912/contents3.html> with its English translation generated by computer.

* cited by examiner 500-2

800-2

210-2

200

80

210-1

800-1

500-1

TERMINAL APPARATUS, COMMUNICATION SYSTEM

CROSS-REFERENCE TO RELATED APPLICATIONS

This application is a U.S. 371 Application of International Patent Application No. PCT/JP2021/008097, filed on 3 Mar. 2021, the disclosure of which is hereby incorporated herein by reference in its entirety.

TECHNICAL FIELD

The present invention relates to a technology for virtually implementing through communication an action such as a high five or a high ten that includes at least contact between body parts of users when performed.

BACKGROUND ART

Non Patent Literature 1 discloses a technology for virtually performing a high five or a high ten through communication. Non Patent Literature 1 describes that a participant remotely performs a high five or a high ten to a soccer player using a video conference system that performs audio and video communication.

Non Patent Literature 2 discloses a technology for transmitting vibration via communication in addition to conventionally transmitted audio and videos. An overview of the technology of Non Patent Literature 2 will be described. As illustrated in FIG. 4, a communication system 80 in Non Patent Literature 2 includes a terminal apparatus 800-1 for a first user 500-1 installed at a first point and a terminal apparatus 800-2 for a second user 500-2 installed at a second point. The terminal apparatus 800-1 is connected to a communication network 200 via a communication line 210-1. The terminal apparatus 800-2 is connected to the communication network 200 via a communication line 210-2. An audio signal, a video signal, and a vibration signal can be mutually transmitted between the terminal apparatuses 800-1 and 800-2. Since the communication of the audio signal is well known, portions related to a video and vibration of the technology in Non Patent Literature 2 will be described below.

On the assumption that each point index is i, as illustrated in FIG. 5, the terminal apparatus 800-i at each point includes a housing 810-i, a control unit 890-i, a camera 820-i, a projector 830-i, a rear surface projection screen 860-i, a vibration measurement sensor 840-i and a vibrator 850-i. The camera 820-i, the projector 830-i, and the rear surface projection screen 860-i are fixed to the housing 810-i. The vibration measurement sensor 840-i and the vibrator 850-i are attached to the rear surface projection screen 860-i. The control unit 890-i outputs a video signal input from the camera 820-i and a vibration signal input from the vibration measurement sensor 840-i to the communication line 210-i, outputs the video signal of the other point input from the communication line 210-i to the projector 830-i, and outputs the vibration signal of the other point input from the communication line 210-i to the vibrator 850-i.

The camera 820-i acquires a video at an i-th point within a range of the vertical viewing angle indicated by the one-dot chain line in FIG. 5 and outputs the video as a video signal to the control unit 890-i. The projector 830-i generates an optical signal corresponding to the video signal of the other point output from the control unit 890-i and projects the optical signal to the rear surface projection screen 860-i.

The rear surface projection screen 860-i allows a video projected from the rear (that is, a side opposite to a side on which a user 500-i is located) to be visually recognized from the front side (that is, the side on which the user 500-i is located), and the lower side is a substantially horizontal plane facing the side on which the user 500-i of the terminal apparatus 800-i is located, and is curved to be closer to a vertical plane (that is, the front surface of the user 500-i) further upward. The vibration measurement sensor 840-i and the vibrator 850-i are mounted on the rear side of the substantially horizontal plane of the rear surface projection screen 860-i. The vibration measurement sensor 840-i acquires vibration applied to the rear surface projection screen 860-i and outputs the vibration as a vibration signal to the control unit 890-i. The vibrator 840-i gives vibration corresponding to the vibration signal of the other point output from the control unit 890-i to the rear surface projection screen 860-i.

According to the technology of Non Patent Literature 2, the first user 500-1 can perceive, from the vibration of the rear surface projection screen 860-1, a vibration applied to a portion of the rear surface projection screen 860-2 near their hand by the second user 500-2 located at the second point while visually recognizing the second user 500-2 at the second point projected on the rear surface projection screen 860-1. For example, when the second user 500-2 takes an action, such as putting something down, writing text with a pencil, or rolling a roller on a portion near their hand of the rear surface projection screen 860-2, the first user 500-1 can feel a tactile sensation corresponding to the action from a vibration of the rear surface projection screen 860-1.

CITATION LIST

Non Patent Literature

Non Patent Literature 1: Japan soccer Association, "REMOTE HIGH FIVE WITH SAMURAI BLUE! International Goodwill Game@Utrecht, The Netherlands", [online], [Retrieved on Dec. 5, 2020], Internet <URL: https://www.jfa.jp/samuraiblue/news/00025513/>

Non Patent Literature 2: "Experience social haptics "Public Tactile Communication"", magazine Future produced by NTT Laboratories specializing in tactile content, [online], [Retrieved on Dec. 5, 2020], Internet <URL: http://furue.ilab.ntt.co.jp/book/201912/contents3.html>

SUMMARY OF INVENTION

Technical Problem

In the technology of Non Patent Literature 1, on a participant side, a virtual high five or a virtual high ten can be visually implemented by a participant touching a video of a palm of a soccer player displayed on a screen with a palm of their hand. However, since the participant touches the screen instead of a camera, the video of the palm of the participant is not displayed in a video viewed by the soccer player, and the soccer player only presents his or her palm in front of the camera for the participant. Therefore, the virtual high five or the virtual high ten is not implemented on the soccer player side. In the technology of Non Patent Literature 1, since tactile information that is important for perception at the time of a high five or a high ten is not transmitted, a virtual high five or a virtual high ten is not implemented tactilely on either the participant side or the soccer player side.

In the technology of Non Patent Literature 2, when a first user touches a video of a palm of a second user displayed on a screen with a palm of their hand, a virtual high five or a virtual high ten can be implemented visually and tactilely on the first user side. However, since the first user touches the screen with the palm of the hand, what is captured by the camera on the side of the first user is the video of the back of the hand of the first user, and what is displayed on the screen on the side of the second user is the video of the back of the hand of the first user. In addition, the second user needs to direct the palm of their hand toward the camera for the first user. Therefore, the second user perceives vibration of the palm of the first user with the back of the hand while touching the video of the back of their hand of the first user with the back of the hand, and the virtual high five or the virtual high ten is not realized visually or tactilely on the second user side.

That is, in the technology of the related art, there is a problem that an action such as a high five or a high ten that includes at least contact between body parts between users cannot be implemented visually or tactilely at both points through communication. An objective of the present invention is to virtually implement an action such as a high five or a high ten that includes at least contact between body parts of users visually and tactilely at both points through communication.

Solution to Problem

A terminal apparatus according to a first aspect of the present invention is a terminal apparatus of a communication system for mutually transmitting visual information and tactile information of an action including contact between a user at an own point and another user at another point. The terminal apparatus includes at least a vibration measurement presentation plate, a camera, a display, a vibration measurement sensor, and a vibrator. The vibration measurement presentation plate is a substantially transparent plate and is disposed on a use position side of the user, and the vibration measurement sensor and the vibrator are mounted on the vibration measurement presentation plate. The display is disposed outside of an imaging range of the camera on a side opposite to the use position side of the user with respect to the vibration measurement presentation plate such that a vibration measurement presentation plate side serves as a display surface. The camera is disposed on the side opposite to the use position side of the user with respect to the vibration measurement presentation plate and is outside of a viewing range of the display surface of the display via the vibration measurement presentation plate from the use position side of the user so that the vibration measurement presentation plate side is in the imaging range. The vibration measurement sensor is attached to the vibration measurement presentation plate to be outside of the imaging range of the camera and outside of a viewing range of the display surface of the display via the vibration measurement presentation plate from the use position side of the user. The vibrator is mounted on the vibration measurement presentation plate to be outside of the imaging range of the camera and outside of the viewing range of the display surface of the display via the vibration measurement presentation plate from the use position side of the user.

In a communication system according to a second aspect of the present invention, a first terminal apparatus that is the terminal apparatus according to the first aspect is disposed at a first point, a second terminal apparatus that is the terminal apparatus according to the first aspect is disposed at a second point that is a point different from the first point, and communication is performed between the first and second terminal apparatuses. The display of the first terminal apparatus displays a video captured by the camera of the second terminal apparatus. The display of the second terminal apparatus displays a video captured by the camera of the first terminal apparatus. The vibrator of the first terminal apparatus presents vibration acquired by the vibration measurement sensor of the second terminal apparatus. The vibrator of the second terminal apparatus presents vibration acquired by the vibration measurement sensor of the first terminal apparatus.

Advantageous Effects of Invention

According to the present invention, an action such as a high five or a high ten that includes at least contact between body parts of users when performed can be virtually realized visually and tactilely at both points through communication.

DESCRIPTION OF EMBODIMENTS

A terminal apparatus according to the present invention and a communication system including the terminal apparatus virtually implement visually and tactilely an action such as a high five or a high ten that includes at least contact between body parts of users when performed at both points through communication, and may virtually implement auditory information at both points through communication. However, in order to virtually implement auditory information at both points through communication, communication of a well-known audio signal may be used in combination. Accordingly, in order not to complicate description, an embodiment of a portion related to tactile information and video information will be described below with regard to a terminal apparatus according to the present invention and a communication system including the terminal apparatus.

Embodiment

Figure 1:
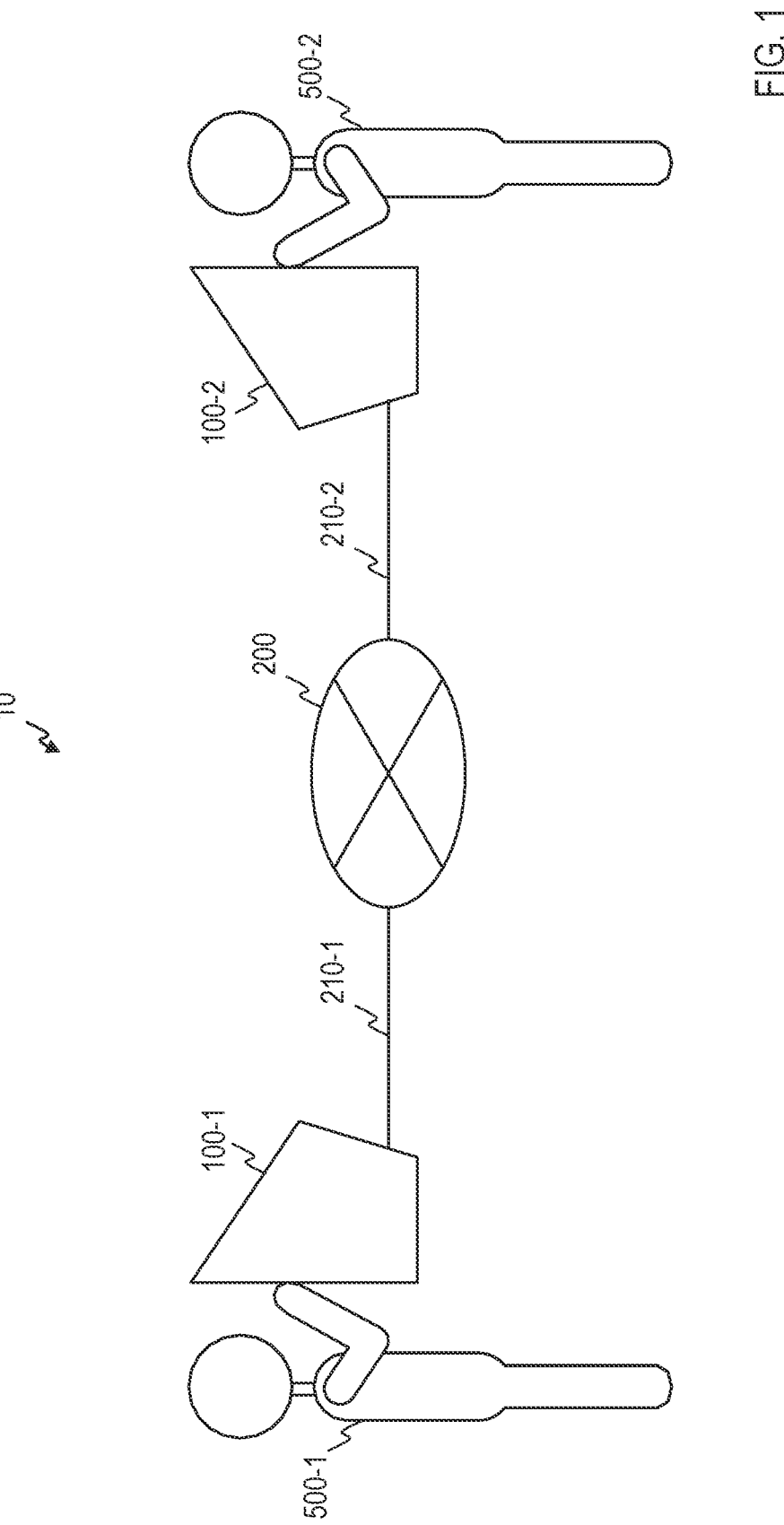
FIG. 1 is a diagram illustrating a configuration of a communication system 10.

As illustrated in FIG. 1, a communication system 10 according to an embodiment of the present invention includes a terminal apparatus 100-1 for a first user 500-1 installed at a first point, a terminal apparatus 100-2 for a second user 500-2 installed at a second point, a communication network 200, and a communication line 210-1 and a communication line 210-2 which are communication lines of the communication network 200. The terminal apparatus 100-1 is connected to the communication network 200 via the communication line 210-1 and the terminal apparatus 100-2 is connected to the communication network 200 via a communication line 210-2, so that at least a video signal and a vibration signal can be mutually transmitted between the terminal apparatus 100-1 and the terminal apparatus 100-2.

Although the communication lines are illustrated by solid lines in FIG. 1, there is no restriction on whether each communication line is wired or wireless and whether each communication network is used for fixed communication or mobile communication. Hereinafter, the terminal apparatuses 100-1 and 100-2 will be described assuming that i is the index of each point.

[[Terminal Apparatus 100-*i*]]

Figure 2:
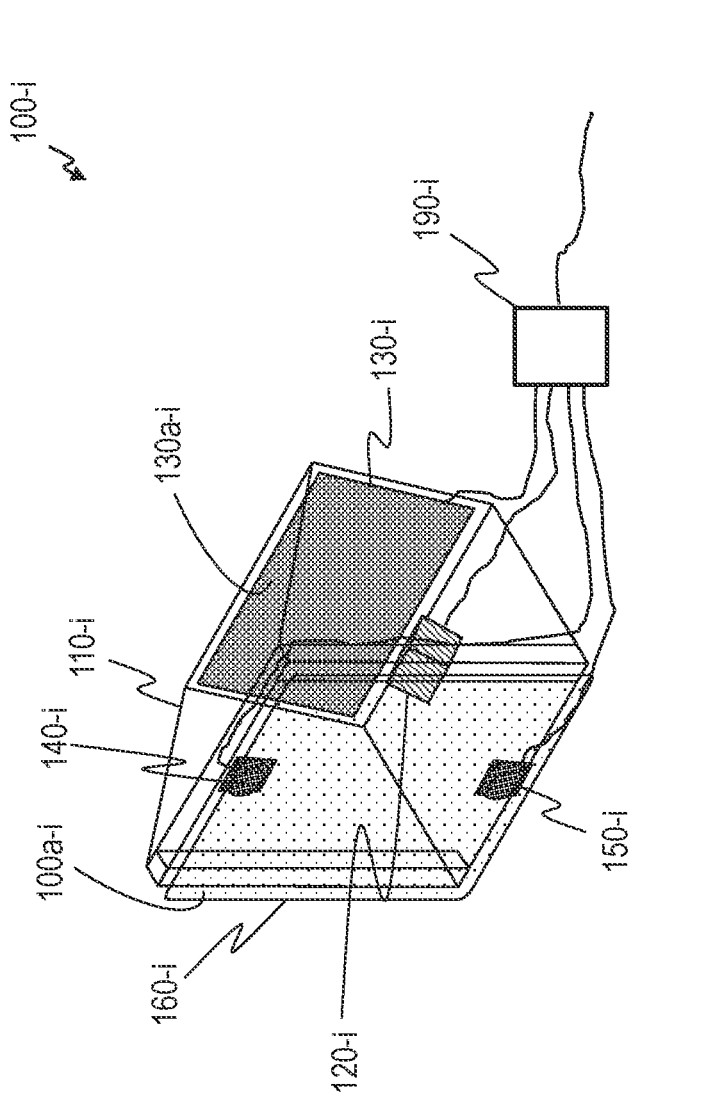
FIG. 2 is a perspective view illustrating a configuration of a terminal apparatus 100-i.
Figure 3:
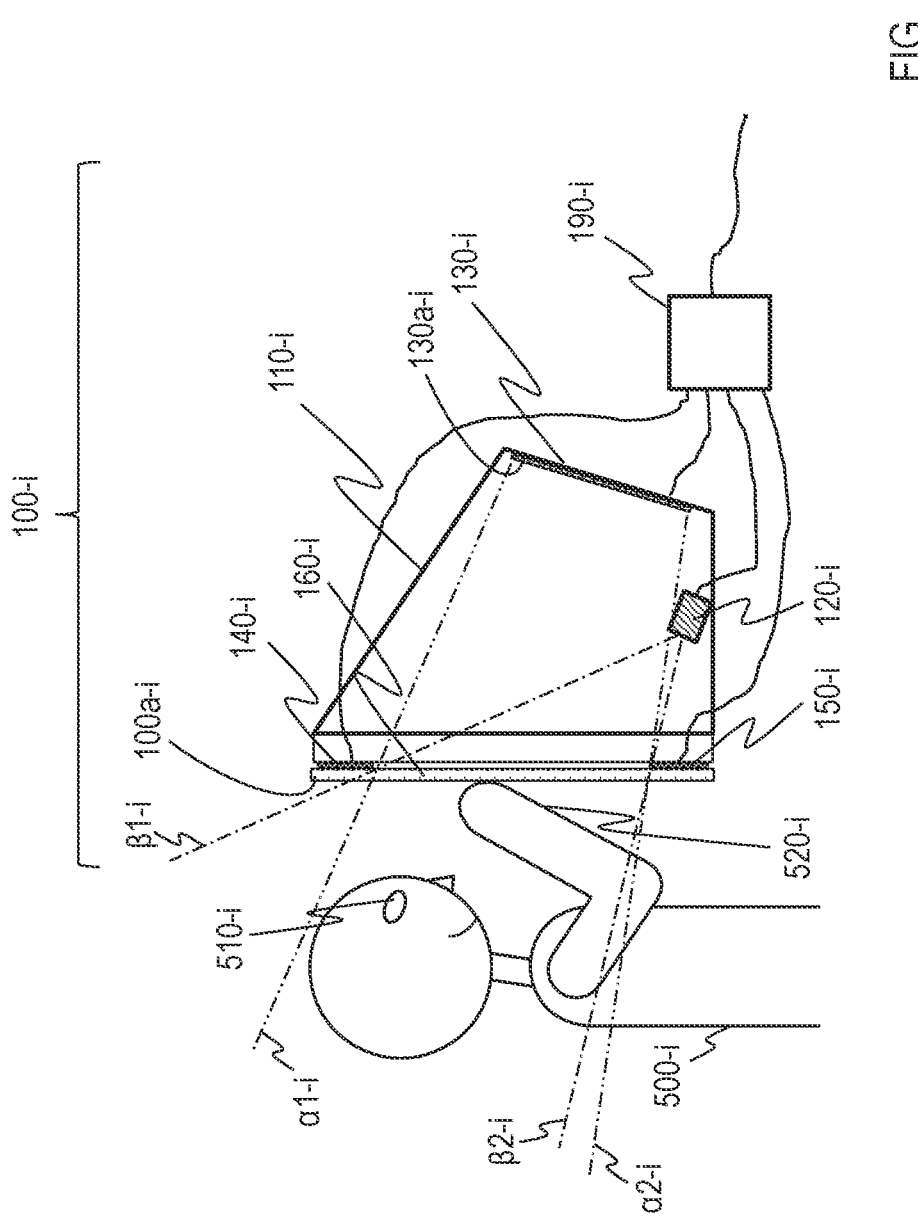
FIG. 3 is a diagram illustrating a configuration of a terminal apparatus 100-i.
Figure 4:
FIG. 4 is a diagram illustrating a configuration of a communication system 80.
Figure 5:
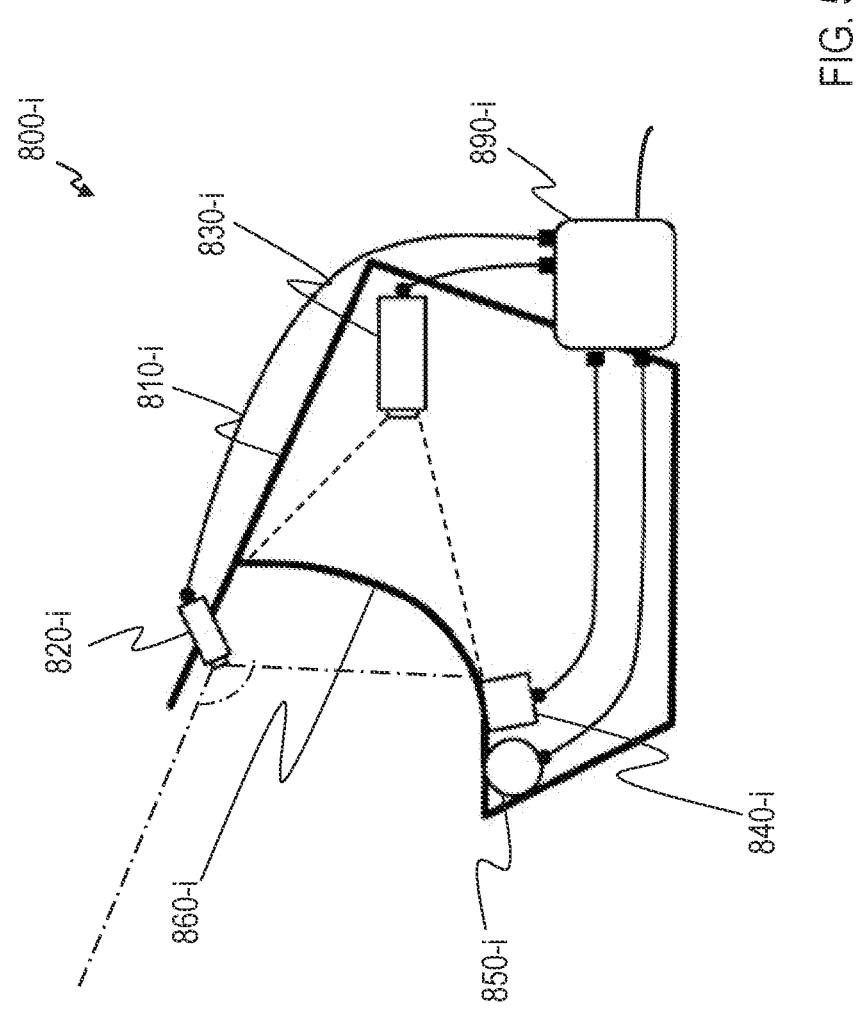
FIG. 5 is a side view illustrating a configuration of a terminal apparatus 800-i.

The terminal apparatus 100-*i* is a terminal apparatus of a communication system mutually transmitting visual information and tactile information of an action including contact between a user at an own point and the other user at the other point, and includes a housing 110-*i*, a camera 120-*i*, a display 130-*i*, a vibration measurement sensor 140-*i*, a vibrator 150-*i*, a vibration measurement presentation plate 160-*i*, and a control unit 190-*i*, as exemplified in FIGS. 2 and 3. When the user 500-*i* uses the terminal apparatus 100-*i*, the user 500-*i* and the terminal apparatus 100-*i* are set to have a relative positional relationship, as exemplified in FIG. 3. More specifically, the left end of the terminal apparatus 100-*i* in FIG. 3 which is a side view is the front surface 100*a*-*i* of the terminal apparatus 100-*i*, and the front surface 100*a*-*i* side (that is, the left side of the terminal apparatus 100-*i* in FIG. 3) of the terminal apparatus 100-*i* is the use position side of the user 500-*i*.

At least the camera 120-*i* and the display 130-*i* are fixed to the housing 110-*i*, and the vibration measurement presentation plate 160-*i* is supported to vibrate. The housing 110-*i* may have a box shape, a frame shape, or any shape as long as the camera 120-*i*, the display 130-*i*, and the vibration measurement presentation plate 160-*i* can be disposed so that each condition described below is satisfied. In the following description, in order to simplify the description, each of a video captured by the camera 120-*i* and a display surface 130*a*-*i* of the display 130-*i* will be described as a rectangle formed by two straight lines in the horizontal direction and two straight lines perpendicular to the horizontal direction.

[[Control Unit 190-*i*]]

The control unit 190-*i* outputs a signal including at least the video signal input from the camera 120-*i* and the vibration signal input from the vibration measurement sensor 140-*i* to the communication line 210-*i*, outputs a video signal of a partner point included in the signal of the point (hereinafter referred to as a "partner point") of a communication partner input from the communication line 210-*i* to the display 130-*i*, and outputs a vibration signal of the partner point included in the signal of the partner point input from the communication line 210-*i* to the vibrator 150-*i*. Since both the vibration measurement sensor 140-*i* and the vibrator 150-*i* are attached to the vibration measurement presentation plate 160-*i*, as will be described below, the control unit 190-*i* may include an echo canceller that removes a vibration signal component due to vibration generated by the vibrator 150-*i* from the vibration signal input from the vibration measurement sensor 140-*i*, and the control unit 190-*i* may output a vibration signal obtained by performing the above-described processing by the echo canceller on the vibration signal input from the vibration measurement sensor 140-*i* to the communication line 210-*i*. The control unit 190-*i* may be fixed to the housing 110-*i*, may be built in the housing 110-*i*, or may not be fixed or built in the housing 110-*i*. The terminal apparatus 100-*i* may not include the control unit 190-*i*, and another apparatus connected to the terminal apparatus 100-*i* may include the control unit 190-*i*, or another apparatus such as a computer connected to the terminal apparatus 100-*i* may function as the control unit 190-*i*.

[[Vibration Measurement Presentation Plate 160-*i*]]

The vibration measurement presentation plate 160-*i* is a substantially transparent plate and is disposed on the use position side of the user 500-*i* (that is, the front surface 100*a*-*i* side of the terminal apparatus 100-*i*). The vibration measurement presentation plate 160-*i* is supported to vibrate by the housing 110-*i*. For example, four corners of the rectangular plate-shaped vibration measurement presentation plate 160-*i* are supported by the housing 110-*i* via an elastic member (not illustrated), and thus the vibration measurement presentation plate 160-*i* is elastically supported by the housing 110-*i*. The vibration measurement sensor 140-*i* and a vibrator 150-*i* are attached to the vibration measurement presentation plate 160-*i*. The vibration measurement presentation plate 160-*i* may preferably have higher transparency and may be uncolored. However, tit is sufficient that the user 500-*i* is able to visually recognize a video displayed on the display 130-*i* via the vibration measurement presentation plate 160-*i* and the camera 120-*i* is able to capture a video of the user 500-*i* via the vibration measurement presentation plate 160-*i*, that is, it is sufficient that the vibration measurement presentation plate 160-*i* may be substantially transparent. The surface of the vibration measurement presentation plate 160-*i* on the use position side of the user 500-*i* is a surface that the user 500-*i* touches with a hand 520-*i* or the like when the user 500-*i* performs a high five, a high ten or the like, and is often a flat surface when the vibration measurement presentation plate 160-*i* is mounted using an acrylic plate or the like, but the surface is not necessarily a flat surface. The surface of the vibration measurement presentation plate 160-*i* on the side opposite to the user 500-*i* side is not necessarily a flat surface. On the surface of the vibration measurement presentation plate 160-*i* on the side opposite to the user 500-*i* side, machining may be performed to inhibit reflection or the like in order to prevent a video displayed on the display 130-*i* from being reflected from the vibration measurement presentation plate 160-*i* and captured by the camera 120-*i*.

[[Display 130-*i*]]

The display 130-*i* is disposed outside of an imaging range of the camera 120-*i* on the side opposite to the use position side of the user 500-*i* (that is, the front surface 100*a*-*i* side of the terminal apparatus 100-*i*) with respect to the vibration measurement presentation plate 160-*i* such that the vibration measurement presentation plate 160-*i* side becomes the display surface 130*a*-*i*. The display 130-*i* is a video display apparatus such as a liquid crystal display or an organic EL display. The display 130-*i* displays a video corresponding to a video signal of the partner point input from the control unit 190-*i* on the display surface 130*a*-*i*.

In the terminal apparatus 100-*i* illustrated in FIGS. 2 and 3, a viewing range of the display surface 130*a*-*i* of the display 130-*i* via the vibration measurement presentation plate 160-*i* from the use position side of the user 500-*i* (that is, the front surface 100*a*-*i* side of the terminal apparatus 100-*i*) is a range in which α1-*i* indicated by a two-dot chain line in FIG. 3 is an upper end and α2-*i* indicated by a two-dot chain line in FIG. 3 as a lower end. The upper end α1-*i* is an upper limit at which the upper end of the display surface 130*a*-*i* of the display 130-*i* can be visually recognized from the use position side of the user 500-*i* (that is, the front surface 100*a*-*i* side of the terminal apparatus 100-*i*) via the vibration measurement presentation plate 160-*i*. The lower end α2-*i* is a lower limit at which the lower end of the display surface 130a-i of the display 130-i can be visually recognized from the use position side of the user 500-i (that is, the front surface 100a-i side of the terminal apparatus 100-i) via the vibration measurement presentation plate 160-i.

[[Camera 120-i]]

The camera 120-i is disposed on the side opposite to the use position side of the user 500-i (that is, the front surface 100a-i side of the terminal apparatus 100-i) with respect to the vibration measurement presentation plate 160-i and is outside of a viewing range of the display surface 130a-i of the display 130-i via the vibration measurement presentation plate 160-i from the use position side (that is, the front surface 100a-i side of the terminal apparatus 100-i) of the user 500-i so that the vibration measurement presentation plate 160-i side is in the imaging range. The camera 120-i is a video acquisition apparatus that captures a video within an imaging range. The camera 120-i acquires a video on the use position side of the user 500-i via the substantially transparent vibration measurement presentation plate 160-i, obtains a video signal corresponding to the acquired video, and outputs the video signal to the control unit 190-i.

In the video acquired by the camera 120-i, it is desirable that the eyes of the user 500-i gaze at the camera 120-i. However, the user 500-i ought to gaze at the display surface 130a-i of the display 130-i. Accordingly, the camera 120-i may be disposed at a position as close as possible to a geometric center (that is, the center of gravity as a planar figure of the display surface) of the display surface 130a-i of the display 130-i. In order to dispose the camera 120-i, when a video display apparatus including a general horizontally long rectangular display surface 130a-i is used as the display 130-i, the camera 120-i may be disposed at a position at which a distance from the left end of the display surface 130a-i of the display 130-i is substantially equal to a distance from the right end of the display surface 130a-i of the display 130-i, and which is close to the display surface 130a-i of the display 130-i. For example, when the height of the display surface 130a-i of the display 130-i (for example, a height of the upper end of the display surface 130a-i) is lower than an average height of eyes 510-i of the user 500-i, the camera 120-i may be arranged close to the center of the lower end of the display surface 130a-i of the display 130-i. That is, when the terminal apparatus 100-i is configured such that the height of the upper end of the display surface 130a-i of the display 130-i is lower than a predetermined height which is the average height of the eyes 510-i of the user 500-i, the camera 120-i may be arranged close to the center of the lower end of the display surface 130a-i of the display 130-i. Conversely, in a case where the height of the display surface 130a-i of the display 130-i is higher than the average height of the eyes 510-i of the user 500-i, the camera 120-i may be arranged close to the center of the upper end of the display surface 130a-i of the display 130-i. That is, when the terminal apparatus 100-i is configured such that the height of the lower end of the display surface 130a-i of the display 130-i is higher than the predetermined height which is the average height of the eyes 510-i of the user 500-i, the camera 120-i may be arranged close to the center of the upper end of the display surface 130a-i of the display 130-i.

In the terminal apparatus 100-i illustrated in FIGS. 2 and 3, the imaging range of the camera 120-i is a predetermined range that has an upper end and a lower end between an upper limit and a lower limit determined by the configuration of the terminal apparatus 100-i. The upper limit of the imaging range of the camera 120-i is $\beta1$-i exemplified by a one-dot chain line in FIG. 3 and is the upper limit at which the camera 120-i can be visually recognized from the use position side of the user 500-i via the vibration measurement presentation plate 160-i. The lower limit of the imaging range of the camera 120-i is $\beta2$-i exemplified by the one-dot chain line in FIG. 3 and is the lower limit at which the camera 120-i can be visually recognized from the use position side of the user 500-i via the vibration measurement presentation plate 160-i.

[[Vibration Measurement Sensor 140-i]]

The vibration measurement sensor 140-i is attached to the vibration measurement presentation plate 160-i to be outside of the imaging range of the camera 120-i and outside of the viewing range of the display surface 130a-i of the display 130-i via the vibration measurement presentation plate 160-i from the use position side of the user 500-i (that is, the front surface 100a-i side of the terminal apparatus 100-i). The vibration measurement sensor 140-i acquires vibration to be applied to the vibration measurement presentation plate 160-i, obtains a vibration signal corresponding to the acquired vibration, and outputs the vibration signal to the control unit 190-i. Although the vibration measurement sensor 140-i is attached to the central portion of the upper end of the vibration measurement presentation plate 160-i in FIG. 2, this attachment position is merely exemplary, and the vibration measurement sensor may be attached to any position as long as the position satisfies the above-described condition.

[[Vibrator 150-i]]

The vibrator 150-i is attached to the vibration measurement presentation plate 160-i to be outside of the imaging range of the camera 120-i and outside of the viewing range of the display surface 130a-i of the display 130-i via the vibration measurement presentation plate 160-i from the use position side of the user 500-i (that is, the front surface 100a-i side of the terminal apparatus 100-i). The vibrator 150-i gives vibration corresponding to the vibration signal of the partner point input from the control unit 190-i to the vibration measurement presentation plate 160-i. Although the vibrator 150-i is attached to the central portion of the lower end of the vibration measurement presentation plate 160-i in FIG. 2, this attachment position is merely exemplary, and the vibrator may be attached to any position as long as the position satisfies the above-described condition.

When the user 500-i gives vibration to the vibration measurement presentation plate 160-i by a high five, a high ten or the like, it is difficult for the user 500-i to perceive vibration given to the vibration measurement presentation plate 160-i by other than the user himself or herself more than when the user does not give vibration to the vibration measurement presentation plate 160-i as when the user is merely touching the vibration measurement presentation plate 160-i. Accordingly, the magnitude of vibration generated by the vibrator 150-i when a vibration signal of a certain magnitude is input may be controlled to be larger when the vibration measurement sensor 140-i detects vibration than when the vibration measurement sensor 140-i does not detect vibration. This control may be performed by the control unit 190-i.

[[Communication System 10]]

When each terminal apparatus 100-i has the above-described configuration and operates, as described above, and the first user 500-1 at the first point uses the terminal apparatus 100-1 and the second user 500-2 at the second point uses the terminal apparatus 100-2 to perform a high five or a high ten, the communication system 10 operates as follows.

When the first user 500-1 performs a high five or a high ten to a vibration measurement presentation plate 160-1, a camera 120-1 acquires a video from the front of the first user 500-1 including the palm as the foremost surface without including a display 130-1, a vibration measurement sensor 140-1, and a vibrator 150-1. The video acquired by the camera 120-1 is displayed on the display surface of the display 130-2. Accordingly, the second user 500-2 can visually recognize the video from the front of the first user 500-1 including the palm on the foremost surface without including the display 130-1, the vibration measurement sensor 140-1, and the vibrator 150-1. When the second user 500-2 performs a high five or a high ten to the vibration measurement presentation plate 160-2, the camera 120-2 acquires a video from the front of the second user 500-2 including the palm as the foremost surface without including the display 130-2, the vibration measurement sensor 140-2, and a vibrator 150-2. A video acquired by the camera 120-2 is displayed on the display surface of the display 130-1. Accordingly, the first user 500-1 can visually recognize the video from the front of the second user 500-2 including the palm on the foremost surface without including the display 130-2, the vibration measurement sensor 140-2, and the vibrator 150-2. That is, the first user 500-1 can visually perform the high five or the high ten the palm of the second user 500-2 with his or her palm, and the second user 500-2 can visually perform the high five or the high ten the palm of the first user 500-1 with his or her palm. Accordingly, according to the communication system 10, the high five or the high ten can be visually realized at both points through communication.

When the first user 500-1 performs a high five or a high ten to the vibration measurement presentation plate 160-1, the vibration measurement sensor 140-1 acquires vibration generated with the palm of the first user 500-1, and the vibration generated in the high five or the high ten of the first user 500-1 is given to the vibration measurement presentation plate 160-2 by the vibrator 150-2. Therefore, the second user 500-2 can perceive vibration with the palm of the hand of the first user 500-1. When the second user 500-2 gives a high five or a high ten to the vibration measurement presentation plate 160-2, the vibration measurement sensor 140-2 acquires vibration generated with the palm of the second user 500-2, and the vibration generated in the high five or the high ten of the second user 500-2 is given to the vibration measurement presentation plate 160-1 by the vibrator 150-1. Therefore, the first user 500-1 can perceive vibration with the palm of the second user 500-2. That is, the first user 500-1 can tactilely give a high five or a high ten to the palm of the second user 500-2 with his or her palm, and the second user 500-2 can tactilely give the high five or the high ten to the palm of the first user 500-1 with his or her palm. Therefore, according to the communication system 10, it is possible to realize the high five or the high ten tactilely at both points via communication.

That is, in the communication system 10, when the terminal apparatus 100-1 for the first user 500-1 is disposed at the first point, the terminal apparatus 100-2 for the second user 500-2 is disposed at the second point that is a point different from the first point, and communication is performed between the terminal apparatuses 100-1 and 100-2, the display 130-1 of the terminal apparatus 100-1 displays a video captured by the camera 120-2 of the terminal apparatus 100-2, the display 130-2 of the terminal apparatus 100-2 displays a video captured by the camera 120-1 of the terminal apparatus 100-1, the vibrator 150-1 of the terminal apparatus 100-1 presents vibration acquired by the vibration measurement sensor 140-2 of the terminal apparatus 100-2, and the vibrator 150-2 of the terminal apparatus 100-2 presents vibration acquired by the vibration measurement sensor 140-1 of the terminal apparatus 100-1. As a result, an action such as a high five or a high ten that includes at least contact between body parts of users when performed can be virtually realized visually and tactilely at both points via communication.

<Supplement>

The description of the embodiments of the above-described present invention has been presented for purposes of illustration and description. There is no intention to be comprehensive or to limit the invention to the disclosed precise form. Modifications and variations can be made from the foregoing instructions. The embodiments have been selected and represented in order to provide the best illustration of the principles of the present invention and to enable those skilled in the art to utilize the present invention in various embodiments and various modifications are added to be appropriate for considered practical use. All such modifications and variations are within the scope of the present invention as defined by the appended claims, interpreted in accordance with a fairly and legally equitable breadth.

The invention claimed is:

1. A terminal apparatus of a communication system for mutually transmitting visual information and tactile information of an action including contact between a user at an own point and another user at another point, the terminal apparatus comprising:

at least a vibration measurement presentation plate, a camera, a display, a vibration measurement sensor, and a vibration generator, wherein the vibration measurement presentation plate is a substantially transparent plate and is disposed on a use position side of the user, and the vibration measurement sensor and the vibration generator are mounted on the vibration measurement presentation plate, wherein the display is disposed on a side opposite to the use position side of the user with respect to the vibration measurement presentation plate, the display is viewable through the vibration measurement presentation plate serving as a display surface to the user, and the display is further positioned outside an image capturing range of the camera, wherein the camera is disposed on the side opposite to the use position side of the user with respect to the vibration measurement presentation plate, the camera is positioned outside a viewing range of the display surface of the display viewable through the vibration measurement presentation plate from the use position side of the user, and the display surface on the vibration measurement presentation plate is within the image capturing range of the camera, wherein the vibration measurement sensor is attached to the vibration measurement presentation plate, the vibration measurement sensor is positioned outside of the image capturing range of the camera, and the vibration measurement sensor is further positioned outside of the viewing range of the display surface of the display viewable through the vibration measurement presentation plate from the use position side of the user, and wherein the vibration generator is mounted on the vibration measurement presentation plate, the vibration measurement presentation plate is positioned outside of the image capturing range of the camera, and the vibration measurement presentation plate is further positioned outside of the viewing range of the display surface of the display viewable through the vibration measurement presentation plate from the use position side of the user.

2. The terminal apparatus according to claim 1, wherein the camera is disposed at a position at which a distance to the camera from a left end of the display surface of the display is substantially equal to a distance to the camera from a right end of the display surface of the display and which is close to the display surface of the display.

3. The terminal apparatus according to claim 1, wherein magnitude of vibration generated by the vibration generator when a vibration signal with certain magnitude is input is greater when the vibration measurement sensor detects vibration than when the vibration measurement sensor does not detect vibration.

4. A communication system comprising:

a first terminal apparatus representing a type of a terminal apparatus according to claim 1, wherein the terminal apparatus comprises:

at least a vibration measurement presentation plate, a camera, a display, a vibration measurement sensor, and a vibration generator, wherein the vibration measurement presentation plate is a substantially transparent plate and is disposed on a use position side of the user, and the vibration measurement sensor and the vibration generator are mounted on the vibration measurement presentation plate, wherein the display is disposed on a side opposite to the use position side of the user with respect to the vibration measurement presentation plate, the display is viewable through the vibration measurement presentation plate serving as a display surface to the user, and the display is further positioned outside an image capturing range of the camera, wherein the camera is disposed on the side opposite to the use position side of the user with respect to the vibration measurement presentation plate, the camera is positioned outside a viewing range of the display surface of the display viewable through the vibration measurement presentation plate from the use position side of the user, and the display surface on the vibration measurement presentation plate is within the image capturing range of the camera, wherein the vibration measurement sensor is attached to the vibration measurement presentation plate, the vibration measurement sensor is positioned outside of the image capturing range of the camera, and the vibration measurement sensor is further positioned outside of the viewing range of the display surface of the display viewable through the vibration measurement presentation plate from the use position side of the user, wherein the vibration generator is mounted on the vibration measurement presentation plate, the vibration measurement presentation plate is positioned outside of the image capturing range of the camera, and the vibration measurement presentation plate is further positioned outside of the viewing range of the display surface of the display viewable through the vibration measurement presentation plate from the use position side of the user, and wherein the first terminal apparatus is disposed at a first point; and a second terminal apparatus representing another type of the terminal apparatus, wherein the second terminal apparatus is disposed at a second point, wherein the second point is distinct from the first point, wherein the first terminal apparatus and the second terminal apparatus are in communication with each other, wherein the first terminal apparatus comprises a first vibration measurement presentation plate, a first camera, a first display, a first vibration measurement sensor, and a first vibration generator, wherein the second terminal apparatus comprises a second vibration measurement presentation plate, a second camera, a second display, a second vibration measurement sensor, and a second vibration generator, wherein the first display of the first terminal apparatus displays a video captured by the second camera of the second terminal apparatus, wherein the second display of the second terminal apparatus displays another video captured by the first camera of the first terminal apparatus, wherein the first vibration generator of the first terminal apparatus presents vibration acquired by the second vibration measurement sensor of the second terminal apparatus, and wherein the second vibration generator of the second terminal apparatus presents vibration acquired by the first vibration measurement sensor of the first terminal apparatus.

5. The terminal apparatus according to claim 1, wherein the vibration measurement presentation plate vibrates according to the tactile information of said another user as the tactile information of the user as measured by the vibration measurement sensor has been removed.

* * * * *